United States Patent
Fujiwara et al.

(10) Patent No.: US 11,874,860 B2
(45) Date of Patent: Jan. 16, 2024

(54) CREATION OF INDEXES FOR INFORMATION RETRIEVAL

(71) Applicant: International Business Machines Corporation, Armonk, NY (US)

(72) Inventors: Hidekazu Fujiwara, Chiba (JP); Yoko Nameki, Tokyo (JP); Soh Ohta, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 16/555,550

(22) Filed: Aug. 29, 2019

(65) Prior Publication Data

US 2019/0384781 A1 Dec. 19, 2019

Related U.S. Application Data

(63) Continuation of application No. 15/083,323, filed on Mar. 29, 2016, now Pat. No. 10,606,815.

(51) Int. Cl.
*G06F 16/00* (2019.01)
*G06F 16/31* (2019.01)
*G06F 16/22* (2019.01)

(52) U.S. Cl.
CPC ............ *G06F 16/313* (2019.01); *G06F 16/22* (2019.01)

(58) Field of Classification Search
None
See application file for complete search history.

(56) References Cited

U.S. PATENT DOCUMENTS

| | | | |
|---|---|---|---|
| 6,098,035 A | 8/2000 | Yamamoto et al. | |
| 6,546,385 B1 | 4/2003 | Mao et al. | |
| 7,356,528 B1* | 4/2008 | Amer-Yahia | ....... G06F 16/8373 |
| 7,840,564 B2 | 11/2010 | Holzgrafe et al. | |

(Continued)

FOREIGN PATENT DOCUMENTS

JP 3696745 B2 9/2005

OTHER PUBLICATIONS

Cohen, "Morphological Analysis Searches For You—Intelligently, Comparing the effectiveness of n-gram indexing vs. morphological analysis," Basis Technology, Mar. 29, 2011, 6 pages, © 2012 Basis Technology Corporation.

(Continued)

*Primary Examiner* — Thu Nguyet T Le
(74) *Attorney, Agent, or Firm* — Eric W. Chesley

(57) ABSTRACT

The present invention may be a system for creating indexes for information retrieval comprises a processor and a memory. The memory has program instructions embodied therewith. The program instructions are executable by the processor to cause the system to read a document having hinting information into a memory, where the hinting information is associated with each unique expression in an original document. The program instructions are further executable to create the indexes from the document, where a first analysis method for generating a contiguous sequence of items from a text in the document is used for creating the indexes for each sequence in the unique expression with which the hinting information is associated and a second analysis method for dividing the text into meaningful units is used for creating the indexes for each word in the text other than the unique expression.

18 Claims, 10 Drawing Sheets

(56) References Cited

U.S. PATENT DOCUMENTS

| | | | |
|---|---|---|---|
| 8,930,372 B2 | 1/2015 | Terui et al. | |
| 2002/0082868 A1 | 6/2002 | Pories et al. | |
| 2003/0140035 A1* | 7/2003 | Burrows | G06F 16/81 |
| 2004/0243409 A1 | 12/2004 | Nakagawa | |
| 2006/0031195 A1* | 2/2006 | Patterson | G06F 16/31 |
| 2007/0016856 A1 | 1/2007 | Graham et al. | |
| 2007/0074159 A1 | 3/2007 | Ueno | |
| 2008/0130699 A1 | 6/2008 | Ma et al. | |
| 2008/0243487 A1* | 10/2008 | Dayan | G06F 40/284 |
| | | | 704/10 |
| 2010/0281030 A1* | 11/2010 | Kusumura | G06F 16/81 |
| | | | 707/769 |
| 2011/0264646 A1 | 10/2011 | Sokolan et al. | |
| 2012/0109969 A1 | 5/2012 | Gil et al. | |
| 2013/0132069 A1 | 5/2013 | Wouters et al. | |
| 2014/0040275 A1 | 2/2014 | Dang et al. | |
| 2015/0112683 A1 | 4/2015 | Fujii et al. | |
| 2017/0286466 A1 | 10/2017 | Fujiwara et al. | |
| 2017/0329810 A1 | 11/2017 | Fujiwara et al. | |

OTHER PUBLICATIONS

Watanabe, "Using Japanese Tokenization to Generate More Accurate Insight," DataSift, Mar. 12, 2014, 6 pages, printed on Mar. 1, 2016, http://dev.datasift.com/blog/using-japanese-tokenization-generate-more-accurate-insight.

Fujiwara et al., "Creation of Indexes for Information Retrieval," IBM U.S. Appl. No. 16/555,601, filed Aug. 29, 2019.

List of IBM Patents or Patent Applications Treated as Related, Aug. 29, 2019, 2 pages.

\* cited by examiner

CHARACTER STRINGS WRITTEN IN JAPANESE

・・・経営企画本部、該文書・・・  491

経"KEI"営"EI"企"KI"画"KAKU"本"HON"部"BU"該"GAI"文"BUN"書"SYO"  492

MORPHOLOGICAL TOKEN OF THE CHARACTER STRINGS

"KEI""EI""KI""KAKU""HON""BU""GAI""BUN""SYO"  493

494

経営("KEI""EI"): ADMINISTRATION

企画("KI""KAKU"): PLANNING

本部("HON""BU"): HEADQUARTER

該("GAI"): THE

文書("BUN""SYO"): DOCUMENT

FIG. 4A

|  | First analysis method | Second analysis method |
|---|---|---|
| Precision ratio (search noise) | low (much) | high (little) |
| Recall ratio (search omission) | high (no omission) | middle (a little omission) |
| Index size | large | small |
| Search speed | slow | quick |

FIG. 7

CREATION OF INDEXES FOR INFORMATION RETRIEVAL

BACKGROUND

This invention relates to an indexing technique, and more specifically to a creation of one or more indexes for information retrieval.

In a variety of fields such as academia, education, IT, business, law, and government, a number of documents are generated and stored as a part of daily work through an e-mail or collaboration platform for an internet or intranet. These documents may include information which may be useful for day-to-day activities, such as when companies promote their business and make better determinations. However, the accumulated data may be enormous. Accordingly, it may not be easy to find appropriate information from these documents by a search using general keywords.

Incidentally, when a user, for example a company member, posts content to network (e.g., an internet or intranet), the user often uses specific terms such as an organization's name which is specific to a company, a project group name, a department name, or a committee name for the purpose of creating and managing the content. However, these specific terms may often not be registered as a keyword. Therefore, a search is performed using a combination of a keyword related to content to be retrieved and all or part of a specific term. Accordingly, it is expected that the content may be efficiently retrieved, using the combination.

SUMMARY

According to one aspect of the present invention, an embodiment of the present invention provides a system for creating indexes for information retrieval comprises a processor and a memory. The memory has program instructions embodied therewith. The program instructions are executable by the processor to cause the system to read a document having hinting information into a memory, where the hinting information is associated with each unique expression in an original document. The program instructions are further executable to create the indexes from the document, where a first analysis method for generating a contiguous sequence of items from a text in the document is used for creating the indexes for each sequence in the unique expression with which the hinting information is associated and a second analysis method for dividing the text into meaningful units is used for creating the indexes for each word in the text other than the unique expression.

According to another aspect of the present invention, a computer program product comprising a computer readable storage medium storing a program of instructions executable by the system to perform one or more methods described herein also may be provided.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4A illustrates an example of character strings written in Japanese used in FIG. 4B.

FIG. 7 illustrates the characteristics of the first analysis method and the second analysis method.

DETAILED DESCRIPTION

Figure 1:
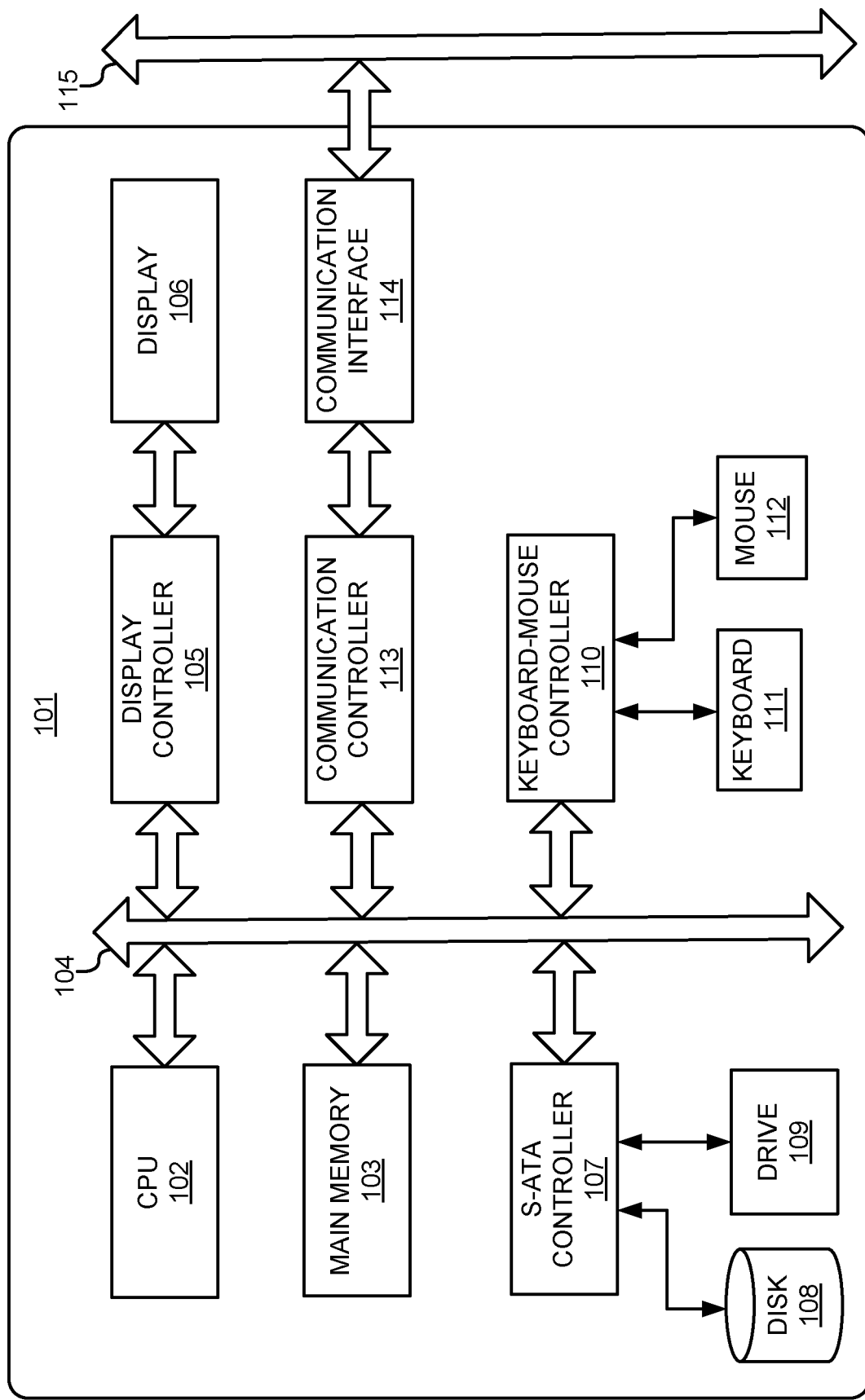
FIG. 1 illustrates an example of a basic block diagram of a computer hardware used in an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following definitions are provided, but the meaning of the terms should be interpreted broadly as known to the technical field to which the present invention relates.

The term "first analysis method" refers to a method for generating a contiguous sequence of one or more items from a text in the document. The items can be categorized as, for example, but not limited to, types of letters or characters, words, phonemes, syllables, amino acid or base pairs.

The first analysis method is for example, but not limited to, a so-called n-gram analysis method. The n-gram analysis method is a contiguous sequence of n items from a given sequence of a text, where n denotes a positive integer. The n-gram of size 1 is referred to as a "unigram"; size 2 is referred to as a "bigram"; size 3 is referred to as a "trigram"; and size n is referred to as an "n-gram".

In a first analysis method, a type of items, the number of n, or combination of these can be used as a parameter, which can be used for modifying the first analysis method.

The term "second analysis method" refers to a method for dividing a text into meaningful units, such as minimum units that have meaning. The second analysis method is for example, but not limited to, a morphological analysis method.

The n-gram analysis method and the morphological analysis method each have advantages and disadvantages, as discussed herein.

The n-gram analysis method generates items from text by segmenting a character string in a mechanical manner. Accordingly, the n-gram analysis method can extract information including a completely matched character string as a search result. Meanwhile, the n-gram analysis method has disadvantages in that (i) noise is easily generated if a character string partially matches a search token, for example, if a word ["to" "kyo" "to"] is determined to match with a search item ["kyo" "to"], and (ii) the n-gram analysis method cannot cover synonymous variations of a word, such as the conjugation of a word registered as an item.

The morphological analysis method generates units of words having meaning by segmenting a text using a dictionary. Accordingly, the morphological analysis method enables high-quality search in consideration of the conjugation of each word with reference to a dictionary. Meanwhile, the morphological analysis method has disadvantages in that (1) any word which is not listed in a dictionary cannot segmented, (ii) if erroneous word segmentation is carried out, even information including completely the same word as in a character string cannot be extracted as a search result, and (iii) maintenance of the dictionary is required, according to a field used in a search query.

With reference now to FIG. 7, a table (701) illustrates the characteristics of the first analysis method, such as the n-gram analysis method, and the characteristics of the second analysis method, such as the morphological analysis method, in view point of precision ratio, recall ratio, index size, and search speed.

The term "unique expression" may include, for example, but not limited to, a proper noun, an abbreviation, a coined word, a new word, or a word or phrase which is described in a language different from a base language used in an original document. The proper noun may be a noun that in its primary application refers to a unique entity as distinguished from a common noun. The proper noun may be, for example, but not limited to, a person's name, a place's name, a country's names, titles of books, a group's name, a building's name, a planet's name, a building year, an identification number, a phone, mobile-phone or facsimile numbers, E-mail addresses, organization names such as company names, international authorities, or national or prefectural institutes.

With reference now to the figures, FIG. 1 illustrates a block diagram of computer hardware (e.g., a computing system) used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running (e.g., executing) on the computer using an appropriate graphics interface. A disk (108) such as a hard disk (e.g., a hard drive) or a solid state drive, SSD, and a drive (109) such as a CD, a DVD, or a BD (Blu-ray disk) drive may be connected to the bus (104) via, for example, an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be explained with reference to the following: FIGS. 2A to 2C, FIG. 3, FIGS. 4A and 4B, FIG. 5 and FIG. 6.

As stated herein, it may not be easy to find appropriate information by a search using general keywords. Also, when a combination of a keyword which relates to a content to be retrieved and all or part of a specific term is used, it is expected that the content can be efficiently retrieved.

Further, it is known that an optimal index method varies depending on a language. Accordingly, a conventional search method employs a technique in which a language used in a content is identified using a language inference engine. However, in some cases of a text written in Japanese or Chinese, sequential kanji characters such as an organization name or document name are not recognized as a single word. Accordingly, there are cases where a flexible search cannot be achieved.

Accordingly, one embodiment of the present invention may provide a method for improving accuracy or effectiveness in text searches. This is performed by using both of the first analysis method and the second analysis method and switching between them, depending on a content in a text.

Figure 2A:
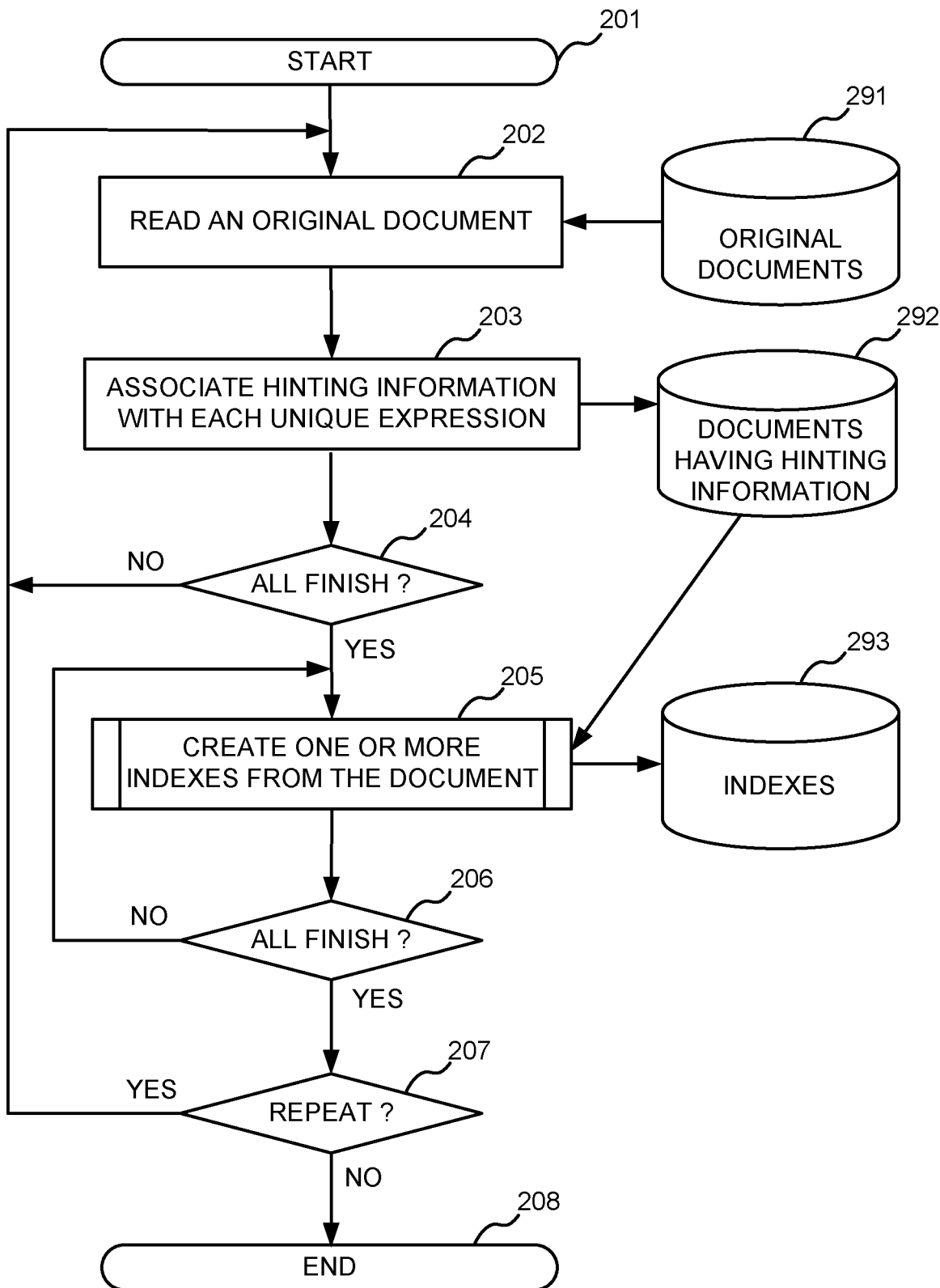
FIG. 2A illustrates one embodiment of a flowchart of a process for creating one or more indexes for information retrieval.
Figure 2B:
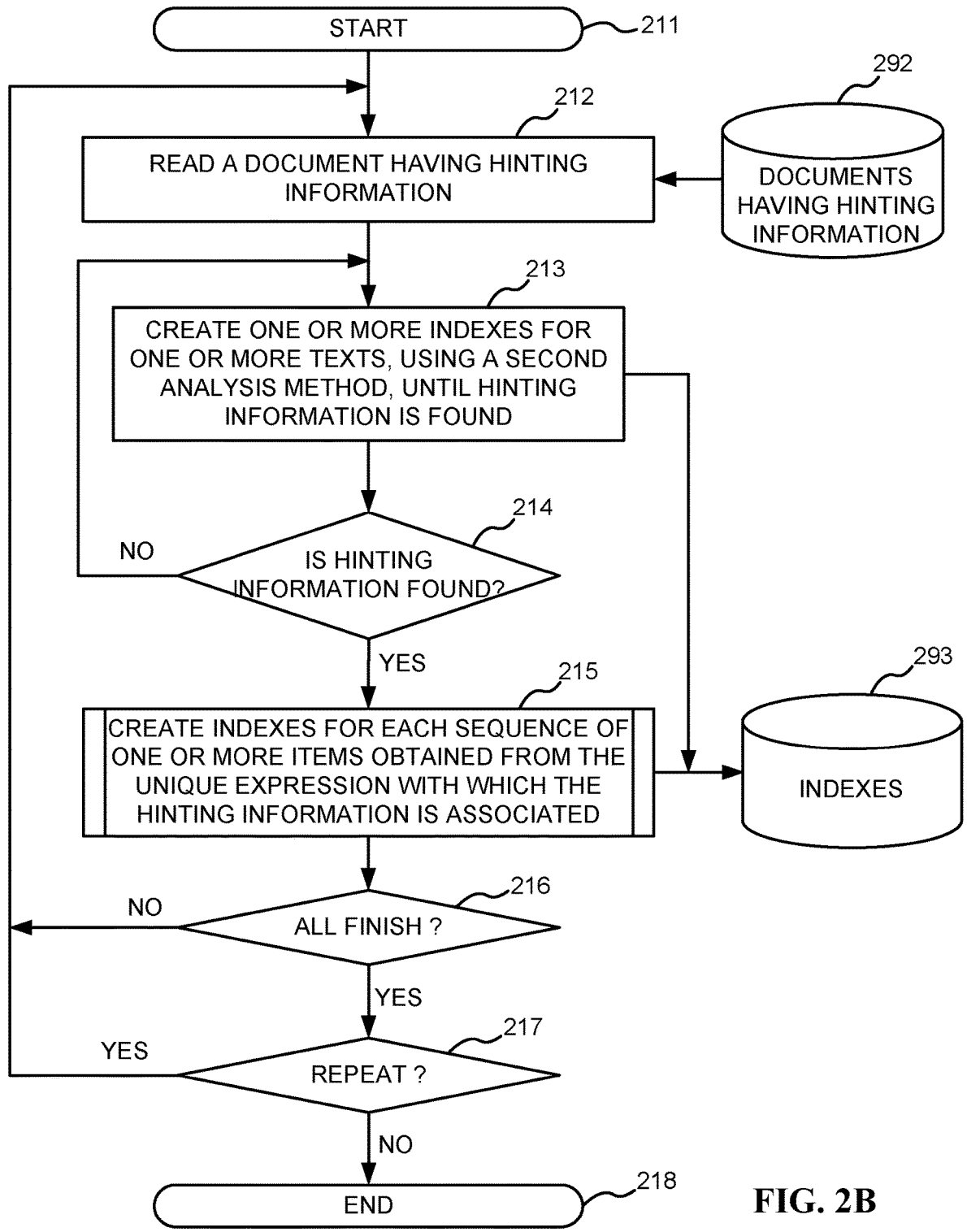
FIG. 2B illustrates another embodiment of a flowchart of a process for creating one or more indexes for information retrieval.
Figure 2C:
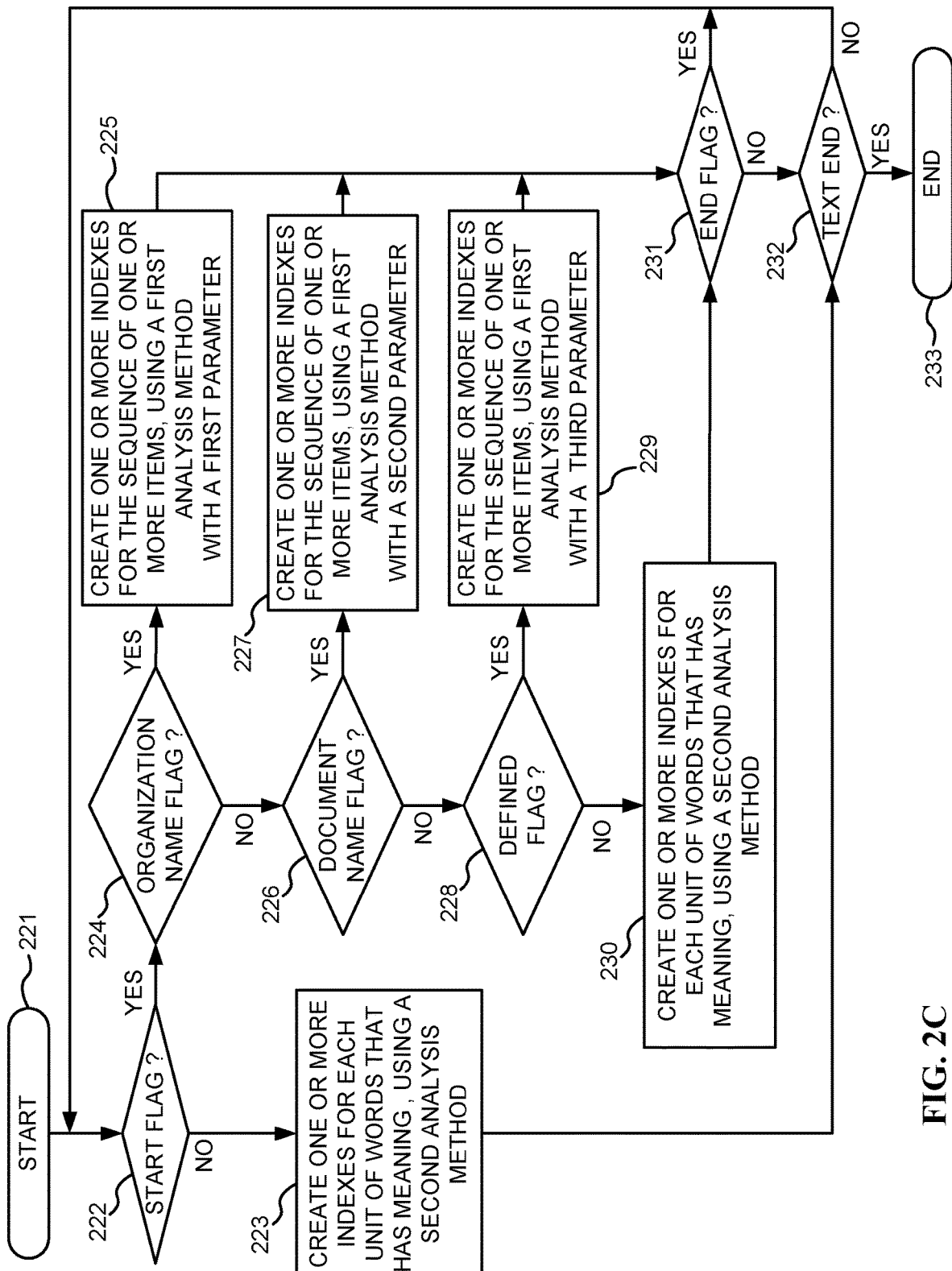
FIG. 2C illustrates an optional embodiment of a flowchart of a process for creating one or more indexes for information retrieval.

FIGS. 2A to 2C, FIGS. 2A to 2C illustrate one embodiment of a flowchart of a process for creating one or more indexes for information retrieval.

A system, such as the computer (101), performs the processes described in FIGS. 2A to 2C. The system may be implemented as a single computer or plurality of computers.

With reference now to FIG. 2A, FIG. 2A illustrates one embodiment of a flowchart of a process for creating one or more indexes for information retrieval.

In step 201, the system starts the process for creating one or more indexes mentioned above.

In step 202, the system reads an original document from a storage (291), such as the disk (108) described in FIG. 1.

The original document may be any information stored in a format accessible by a computer, for example, but not limited to, a document file, spread sheet file, presentation file, database file, image file, or video file, blog data, or application data.

The original document may be written in any language, for example, but not limited to English, French, Italian, German, Spanish, Russian, Greek, Turkish, Arabic or Hebrew which are known as a single-byte character set, or Japanese, Chinese or Korean which are known as a multi-byte character set. The original document may be written in the same (e.g., a single) or different (e.g., multiple) languages.

In step 203, the system associates hinting information with each unique expression in the original document. The system may take up (e.g., identify) each unique expression in the original document, for example: (1) using an engine for inferring existence of an unique expression (herein after referred to as "automatic hinting"); (2) at the time when an unique expression is stored in a storage, using a software application (herein after referred to as "attribute hinting"); or (3) at the time when one or more unique expressions are manually selected (herein after referred to as "manual hinting").

In the automatic hinting, any engine known in the art can be used for inferring existence of a unique expression. For example, when the engine is used for searching for an organization name and the engine determines that the organization name is found in an original document, the system may put hinting information before (and optionally after) the found organization name, such as <orgtitle> organization name </orgtitle>. For example, when the engine is used for searching for a document title and the engine determines that the document title is found in an original document, the system may put hinting information before (and optionally after) the found document title, such as <doctitle> document title </doctitle>. The automatic hinting can be applied not only to organization name and document title but also other types of unique expressions.

In the attribute hinting, for example, an information sharing platform, such as the company collaboration platform, can be used to insert hinting information before (and optionally after) a unique expression. The information sharing platform releases information to be published. The information may include, for example, profile information of a member, such as a company name, an affiliation name or group name. When such information is registered into the information sharing platform, the system may recognize such information as a unique expression and insert hinting information before (and optionally after) such the recognized unique expression. Accordingly, hinting information can be automatically associated with a unique expression, using the information sharing platform. An example how to extract a unique expression and then insert hinting information before (and optionally after) the unique expression in an original document will be shown in FIG. 5 mentioned below. For another example, many e-mail systems in organizations can be used to insert hinting information before (and optionally after) a unique expression. The e-mail system has a mechanism for automatically or manually adding the organization name to the address. The system may insert hinting information before (and optionally after) the organization name, i.e. a unique expression, when the organization name is added to the address. Accordingly, hinting information can be automatically associated with a unique expression, using the e-mail system.

In the manual hinting, a user can manually select each unique expression in an original document. The selected unique expression may be stored in a storage and recognized by a system as a unique expression.

The system may store the document having hinting information in a storage (292), such as the disk (108) described in FIG. 1.

The hinting information may be information used for identifying a unique expression in an original document. The hinting information may be a flag or symbol.

The flag may be described, for example, in a form of a tag format, for example, but not limited to, an XML or HTML tag format. In some embodiments, the XML, tag format, for example, may allow a user to easily extend hinting information, and further allows a system to easily skip unsupported hinting information due to a simple syntax processing even when a search engine for information retrieval does not support hinting information according to the present invention.

In one embodiment, the flag may be a set of (e.g., one or more) start tags and end tags. For example, a start tag may be expressed as in a format of <XXXX> and an end tag may be expressed as in a format of </XXXX>. The characters, XXXX, may denote a syntax of a tag information indicating hinting information or information on an attribute of a unique expression.

The syntax of a tag information indicating hinting information may be, for example, but not limited to, "HINTING", "HINTINFO" or "HINTINGINFO". For example, the flag may be expressed as <HINTING>, <HINTINFO> or <HINTINGINFO> as a start tag, and as </HINTING>, </HINTINFO> or </HINTINGINFO>, respectively, as an end tag. The start tag and end tag are used for inserting the hinting information before, especially just before, and after, especially just after, a unique expression, respectively.

The information on an attribute of a unique expression may be, for example, but not limited to, an organization name or document title. For example, the flag may be expressed as <orgtitle> and </orgtitle> for an organization name, or <doctitle> and </doctitle> for a document title. For example, the start tag, <orgtitle>, and end tag, </orgtitle>, may be used for inserting the hinting information before and after a unique expression an attribute of which is an organization name, respectively. For example, the start tag, <doctitle>, and end tag, </doctitle>, may be used for inserting the hinting information before and after a unique expression an attribute of which is a document title, respectively.

In another embodiment, the flag may be a tag having information on the number of words or letters or on the number of bytes in a unique expression for which a first analysis method is used. For example, the tag having information on the number of words or letters or on the number of bytes in a unique expression for which the first analysis method is used may be expressed as in a format of <XXXX, the number of words or letters or on the number of bytes in a unique expression for which the first analysis method is used>. As stated above, the characters, XXXX, may denote a syntax of a tag information indicating hinting information or information on an attribute of a unique expression. The number of words in a unique expression may be used when a language used in an original document is a language represented by a single-byte character set or a language of a unique expression is a language represented by a single-byte character set. The number of letters in a unique expression may be used when a language used in an original document is a language represented by a double-byte character set or a language of a unique expression is a language represented by a double-byte character set. For example, the flag may be expressed as <HINTING, the number of words or letters in a unique expression for which the first analysis method is used>, <HINTINFO the number of words or letters in a unique expression for which the first analysis method is used>, <HINTINGINFO the number of words or letters in a unique expression for which the first analysis method is used>, <orgtitle, the number of words or letters in a unique expression for which the first analysis method is used>, or <doctitle, the number of words or letters in a unique expression for which the first analysis method is used> as a start tag. In these tags, only start tag is used for inserting the hinting information before, especially just before, a unique expression.

The flag tag may further include information about a first analysis method to be used. The information about a first analysis method to be used. may be a parameter mentioned above, i.e. a type of items, such as letters or characters, words, phonemes, syllables, amino acid or base pairs, the value of n in an n-gram analysis method, or combination of these.

The symbol may be one or more, especially two or more of a combination of any characters. The symbol may be, for example, but not limited to, ||, ^^, or //. The symbol may be inserted before (e.g. just before) a unique expression and the end tag may be inserted after (e.g., especially just after) the unique expression.

Examples of the hinting information will be described in FIGS. 3 and 4B mentioned below.

In step 204, the system determines whether the process of the step 203 for each original document has been completed. If the determination is positive (e.g., the process has been completed), the system proceeds to step 205 mentioned below. Meanwhile, if the determination is negative (e.g., the process has not been completed), the system returns back to the step 202 and then repeats the steps 202 to 204.

In step 205, the system may read a document having hinting information into a memory from the storage (292) and then create one or more indexes from the document.

The system may start a process for finding (e.g., search for) hinting information. If the hinting information is found, one or more indexes for each sequence of items obtained from the unique expression associated with the found hinting information is created using the first analysis method. When the hinting information is not found, one or more indexes for one or more units of words that has meaning other than the unique expression are created using the second analysis method.

The detail of creating one or more indexes using the first analysis method or the second analysis method described in the step 205 will be explained in FIG. 2C mentioned below.

The system may store the created one or more indexes into a storage (293), such as a disk (108) described in FIG. 1.

In step 206, the system determines whether the process of the step 205 for each document having hinting information has been completed. If the determination is positive, the system proceeds to step 207 mentioned below. Meanwhile, if the determination is negative, the system proceeds back to the step 205 and then repeats the steps 205 and 206.

In step 207, the system determines whether to repeat steps 202 to 206. If the determination is positive, the system proceeds to back to step 202 and then repeats the steps 202 to 207. Meanwhile, if the determination is negative, the system proceeds to a final step 208 mentioned below.

The system determines that the determination is positive, for example, if one of the following situations are found: (a) a fixed interval for the repetition is set; (b) a set time for the repetition is set; (c) a repetition is manually required; (d) when the document is updated, or (e) when a new document having hinting information is in generated.

In step 208, the system terminates the process mentioned above (e.g., the process described in FIG. 2A).

The steps 202 and 204 can be implemented as separate steps performed in another computer. Another example of such will be explained by referring to FIG. 2B mentioned below.

With reference now to FIG. 2B, FIG. 2B illustrates another embodiment of a flowchart of a process for creating one or more indexes for information retrieval.

In step 211, the system starts the process for creating one or more indexes mentioned above.

In step 212, the system reads a document having hinting information into a memory from the storage (292). The document having hinting information was already made in advance prior to starting of the step 211 or was made by another computer.

In step 213, the system creates one or more indexes of a text in the document, using the second analysis method, until the hinting information is found.

In step 214, the system determines whether hinting information is found during a creation of the one or more indexes described in step 213. If the determination is positive, the system proceeds to step 215 mentioned below. Meanwhile, if the determination is negative, the system proceeds back to the step 213 and then repeats the steps 213 and 214.

In step 215, the system creates one or more indexes for each sequence of items obtained from the unique expression associated with the found hinting information using the first analysis method instead of the second analysis method. The switching from the second analysis method to the first analysis method is carried out (e.g., executed), for example, using a preprocessor.

After the one or more indexes for each sequence of items obtained from the unique expression associated with the found hinting information is associated is created, the system may carry out the second analysis method instead of the first analysis method. The switching from the first analysis method to the second analysis method is carried out, for example, using the preprocessor.

The detail of creating one or more indexes using the first analysis method or the second analysis method in the step 215 will be explained by referring to FIG. 2C mentioned below.

In step 216, the system determines whether the process of the step 215 for each document having hinting information has been completed. If the determination is positive, the system proceeds to step 217 mentioned below. Meanwhile, if the determination is negative, the system proceeds back to the step 212 and then repeats the steps 212 to 216.

In step 217, the system determines whether the steps 212 to 216 are to be repeated. If the determination is positive, the system proceeds to back to step 212 and then repeats the steps 212 to 217. Meanwhile, if the determination is negative, the system proceeds to a final step 218 mentioned below.

The system determines that the determination is positive, for example, if the situations mentioned in step 208 of FIG. 2A are found.

In step 218, the system terminates the process mentioned above.

With reference now to FIG. 2C, FIG. 2C illustrates an embodiment of a flowchart of a process for creating one or more indexes using the first analysis method or the second analysis method described in the steps 205 or 215.

Let us suppose that a document having hinting information used in FIG. 2C has hinting information, such as <orgtitle> organization name </orgtitle>, or <doctitle> document title </doctitle>.

In step 221, the system starts the process for creating one or more indexes mentioned above and then starts to find (e.g., search for) hinting information in the document having hinting information.

In step 222, the system determines whether the found hinting information is a start tag, in response to find hinting information. If the determination is positive, the system proceeds to step 224 mentioned below. Meanwhile, if the determination is negative, the system proceeds to step 223 mentioned below.

In step 223, the system creates one or more indexes for each unit of words that has meaning other than unique expression, using a second analysis method.

In step 224, the system determines whether the start tag is an organization name flag, such as <orgtitle>. If the determination is positive, the system proceeds to step 225 mentioned below. Meanwhile, if the determination is negative, the system proceeds to step 226 mentioned below.

In step 225, the system creates one or more indexes for each sequence of one or more items obtained from the organization name as a unique expression, using a first analysis method with a first parameter. As the first parameter, a type of items, the number (e.g., the value) of n, or combination of these can be used for modifying the first analysis method, as mentioned above. The first parameter can be determined in advance, depending on an attribute of a unique expression, i.e., an organization name. The system proceeds to step 231 after the creation of the one or more indexes.

In step 226, the system determines whether the start tag is a document name flag, such as <doctitle>. If the determination is positive, the system proceeds to step 227. Meanwhile, if the determination is negative, the system proceeds to step 228.

In step 227, the system creates one or more indexes for each sequence of one or more items obtained from the document name as a unique expression, using a first analysis method with a second parameter. As the second parameter, a type of items, the number of n, or combination of these can be used for modifying the first analysis method, as mentioned above. The second parameter can be determined in advance, depending on an attribute of a unique expression, i.e., a document title. The second parameter used in step 227 may be the same or different from the first parameter used in step 225. The system proceeds to step 231 after the creation of the one or more indexes.

In step 228, the system determines whether the start tag is a defined flag. If the determination is positive, the system proceeds to step 229. Meanwhile, if the determination is negative, the system proceeds to step 230.

In step 229, the system creates one or more indexes for each sequence of one or more items obtained from the unique expression, using a first analysis method with a third parameter. As the third parameter, a type of items, the number of n, or combination of these can be used for modifying the first analysis method, as mentioned above. The third parameter can be determined in advance, depending on an attribute of a unique expression. The third parameter used in step 229 is the same or different from the first parameter used in step 225 or the second parameter used in step 227. The system proceeds to step 231 after the creation of the one or more indexes.

In step 230, the system creates one or more indexes for each unit of words that has meaning other than unique expression, using a second analysis method.

In step 231, the system determines whether there is an end tag. If there is the end tag, the system proceeds back to step 222. Meanwhile, if there is no end tag, the system proceeds to step 232.

In step 232, the system determines whether the text which is a target to be indexed has been processed up to the end. If the determination is negative, the system proceeds to step 222. Meanwhile, if the determination is positive, the system proceeds to a final step 233.

In step 233, the system terminates the process mentioned above.

Figure 3:
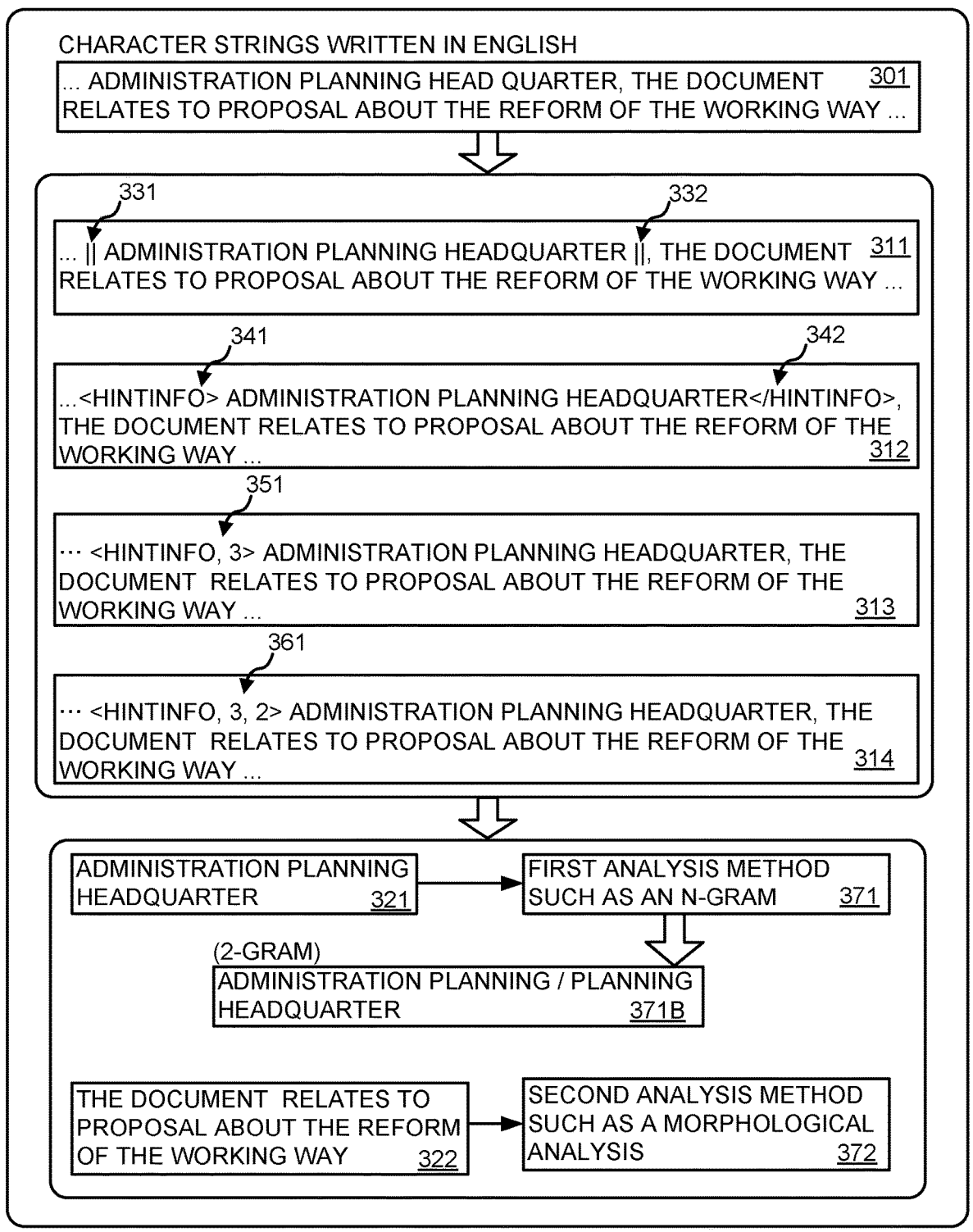
FIG. 3 illustrates an embodiment of creating one or more indexes from character strings written in English.
Figure 4B:
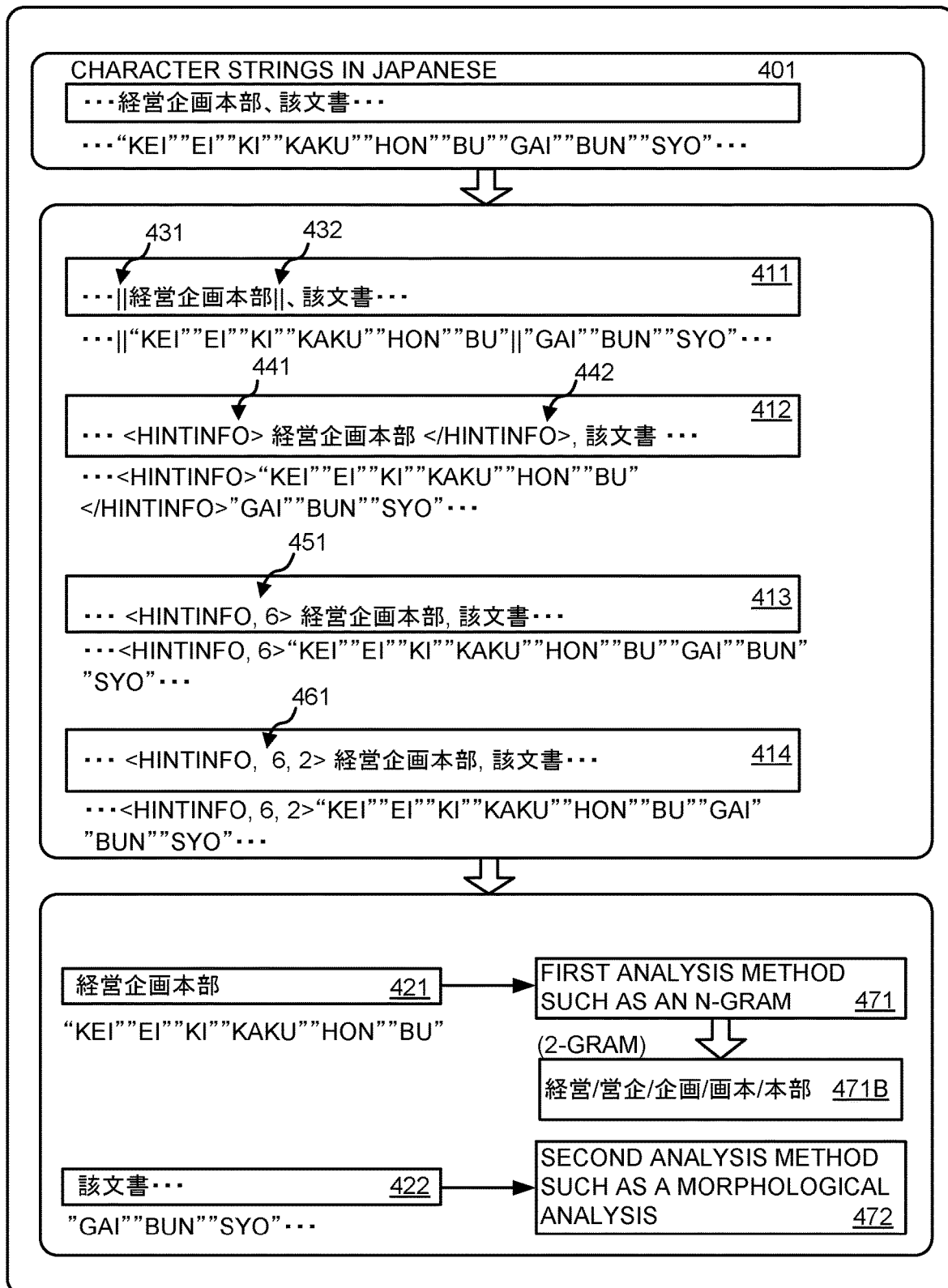
FIG. 4B illustrates an embodiment of creating one or more indexes from the character string written in Japanese.

FIGS. 3, 4A and 4B, FIG. 3 illustrates embodiments of creating one or more indexes in different languages.

With reference now to FIG. 3, FIG. 3 illustrates an embodiment of creating one or more indexes from character strings written in English, a single-byte character set language.

Let us suppose that an original document has a text including the following character strings written in English, " . . . administration planning headquarter, the document relates to proposal about the reform of the working way . . . " (301).

The system reads the original document from a storage and then associates hinting information with each unique expression in the original document. The unique expression in the character strings (301) is "administration planning headquarter".

Four examples of a document having hinting information are shown in each box (311 to 314).

The first example is show in the box (311). The box (311) shows that a pair of symbols, ‖ (331 and 332), were inserted before and after "administration planning headquarter".

The second example is shown in the box (312). The box (312) shows that a start tag, <HINTINFO> (341), was inserted before "administration planning headquarter" and an end tag, </HINTINFO> (342), was inserted after "administration planning headquarter".

The third example is shown in the box (313). The box (313) shows that only start tag, <HINTINFO, 3> (351), was inserted before "administration planning headquarter". The numeral, "3" in the start tag denotes that the number of words in the unique expression.

The forth example is shown in the box (314). Let us suppose that a unit of n-gram analysis method to be applied is an English word in this example. The box (314) shows that only start tag, <HINTINFO, 3, 2> (361), was inserted before "administration planning headquarter". The former numeral, "3" in the start tag denotes that the number of words in the unique expression. The latter numeral, "2", in the start tag denotes that n in the n-gram analysis method to be applied for this unique expression is "2".

In the third and fourth examples, only start tag is inserted, i.e. an end tag is not necessary. This is because the start tag has information on the number of words in the unique expression.

The system creates one or more indexes for the document having hinting information (311, 312, 313 or 314), by switching between the first analysis method (371) and the second analysis method (372).

When 2-gram analysis method as the first analysis method (371) is applied to the unique expression, "administration planning headquarter" (321), two sequences, "administration planning" and "planning headquarter", is obtained from the unique expression. The system creates an index for each sequence, "administration planning" and "planning headquarter" (371B).

After the creation of the indexes from the unique expression, the system creates one or more indexes from the following character strings, "the document relates to proposal about the reform of the working way . . . " (322). Thus, the system creates one or more indexes for the each word that has meaning other than the unique expression, "administration planning headquarter", using the second analysis method (372), such as the morphological analysis.

With reference now to FIG. 4A, FIG. 4A illustrates an example of character strings written in Japanese used in FIG. 4B.

Prior to explaining an embodiment of creating one or more indexes from character strings written in Japanese, the character string used in FIG. 4B will be explained first.

The box (491) shows character strings written in Japanese Kanji. Nine Japanese Kanji characters and one punctuation mark are written there.

The box (492) shows that how Japanese Kanji characters are expressed using alphabetic characters.

The box (493) shows a morphological token of the character strings written in Japanese Kanji (491).

The box (494) shows English meaning of words written in Japanese (491).

In FIG. 4B, morphological token (493) will be used for explaining an embodiment of creating one or more indexes from character strings written in Japanese.

With reference now to FIG. 4B, FIG. 4B illustrates an embodiment of creating one or more indexes from the character string written in Japanese.

Let us suppose that an original document has a text including the following character strings written in Japanese, " . . . " "kei" "ei" "ki" "kaku" "hon" "bu" "gai" "bun" "syo" " . . . " (401).

The system reads the original document from a storage and then associates hinting information with each unique expression in the original document. The unique expression in the character strings (401) is ""kei" "ei" "ki" "kaku" "hon" "bu"".

Four examples of a document having hinting information are shown in each box (411 to 414).

The first example is show in the box (411). The box (411) shows that a pair symbols, (431 and 432), were inserted before and after the letters in Japanese ""kei" "ei" "ki" "kaku" "hon" "bu"".

The second example is shown in the box (412). The box (412) shows that a start tag, <HINTINFO> (441), was inserted before the letters in Japanese ""kei" "ei" "ki" "kaku" "hon" "bu"" and an end tag, </HINTINFO> (442), was inserted after the letters in Japanese ""kei" "ei" "ki" "kaku" "hon" "bu"".

The third example is shown in the box (413). The box (413) shows that only start tag, <HINTINFO, 6> (451), was inserted before the six letters in Japanese ""kei" "ei" "ki" "kaku" "hon" "bu"". The numeral, "6" in the start tag denotes that the number of letters in the unique expression.

The forth example is shown in the box (414). Let us suppose that a unit of n-gram analysis method to be applied is a Japanese letter in this example. The box (414) shows that only start tag, <HINTINFO, 6, 2> (461), was inserted before the six letters in Japanese ""kei" "ei" "ki" "kaku" "hon" "bu"". The former numeral, "6" in the start tag denotes that the number of letters in the unique expression. The latter numeral, "2", in the start tag denotes that n in the n-gram analysis method to be applied for this unique expression is "2".

In the third and fourth examples, only start tag is inserted, i.e. an end tag is not necessary. This is because the start tag has information on the number of letters in the unique expression.

The system creates one or more indexes for the document having hinting information (411, 412, 413 or 414), by switching the first analysis method (471) and the second analysis method (472).

When 2-gram analysis method as the first analysis method (471) is applied to the unique expression, ""kei" "ei" "ki" "kaku" "hon" "bu"" (421), five sequences, ""kei" "ei"", "ei" "ki"", "ki" "kaku"", "kaku" "hon" and "hon" "bu"", is obtained from the unique expression. The system creates an index for each sequence, "kei" "ei"", "ei" "ki"", "ki" "kaku", "kaku" "hon" and "hon" "bu" (471B).

After the creation of the indexes from the unique expression, the system creates one or more indexes from the following character strings, ""gai" "bun" "syo"" (422). Thus, the system creates one or more indexes for each unit of words that has meaning other than the unique expression, ""kei" "ei" "ki" "kaku" "hon" "bu"", using the second analysis method (472), such as the morphological analysis.

According to an embodiment described in FIGS. 4A and 4B, the unique expression can be efficiently and correctly searched from documents to be searched, without adding a unique expression into a dictionary which may be used in a second analysis method, without bloating a search index, and without declining a speed and accuracy of the search of keywords other than a unique expression.

Figure 5:
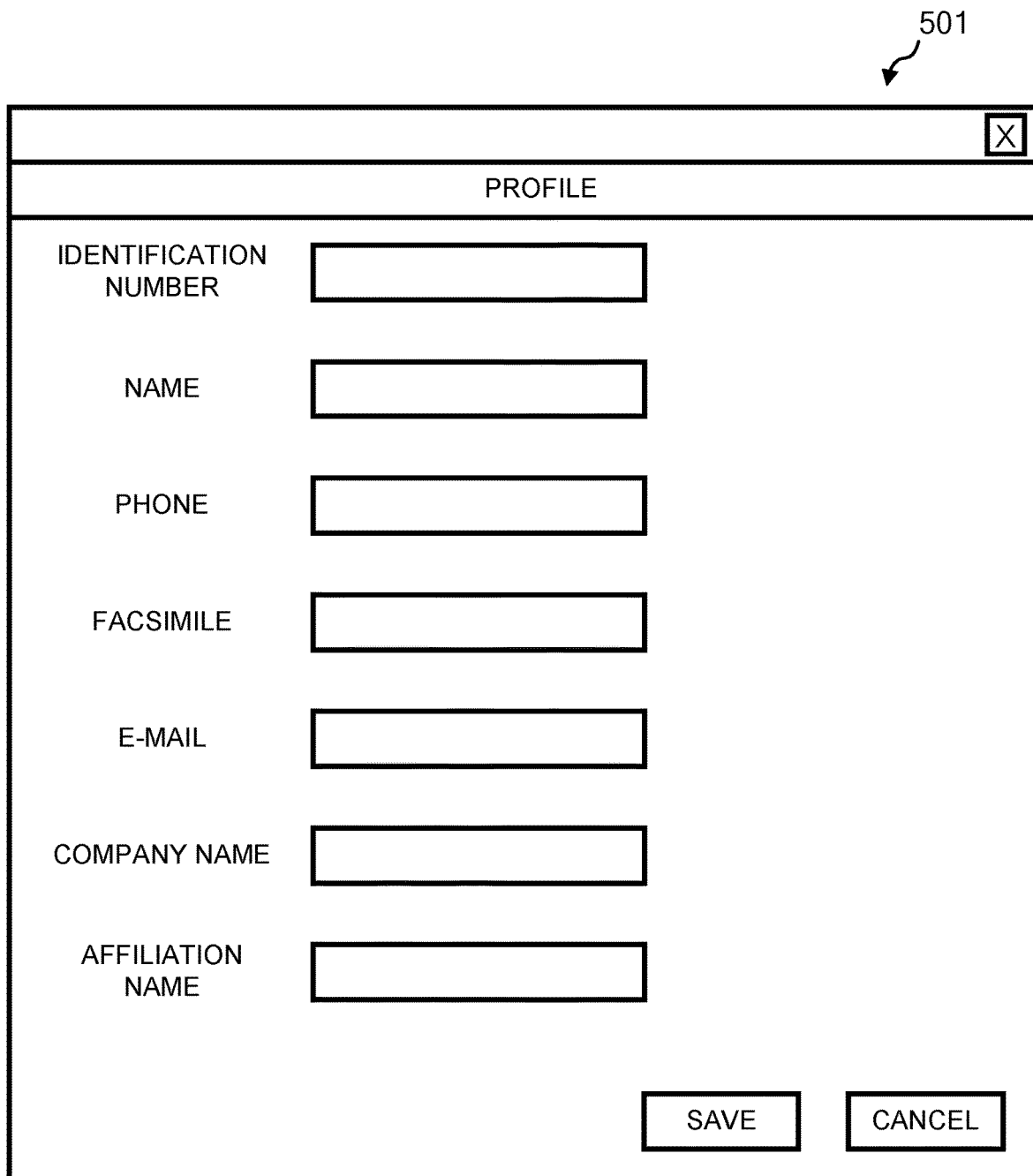
FIG. 5 illustrates an embodiment of a user interface used in an embodiment of the present invention.

With reference now to FIG. 5, FIG. 5 illustrates an embodiment of a user interface used for extracting a unique expression and then inserting hinting information before (and optionally after) the unique expression in an original document.

A window (501) shows a user interface used for inputting a user profile provided by, for example, the information sharing platform.

The user interface has items to be input by a user or to be input automatically. The items may be, for example, but not limited to, identification number, name, phone number, facsimile number, e-mail address, company name, and affiliation name. A user may input parts of the items and the other items are automatically input by a system used in the information sharing platform.

When the user would like to register her or his profile, the user may press a button of "save". After then, the system may generate or update a profile document. The system may also extract content in the items and recognized the content as a unique expression. Then, the system may insert hinting information before (and optionally after) the unique expression in the profile document.

Figure 6:
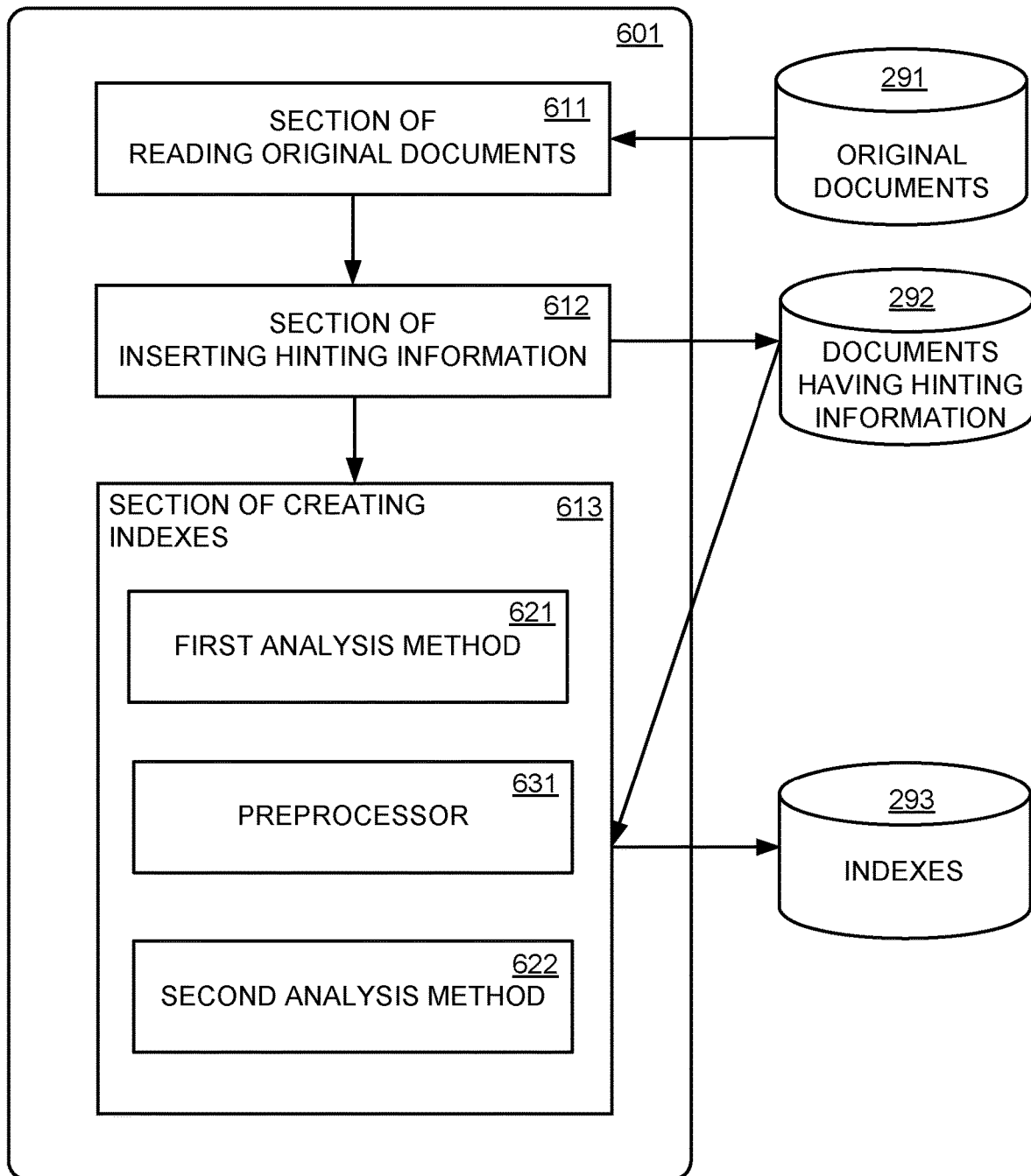
FIG. 6 illustrates one embodiment of an overall functional block diagram of a computer hardware used in an embodiment of the present invention.

With reference now to FIG. 6, FIG. 6 illustrates one embodiment of an overall functional block diagram of a computer hardware used in an embodiment of the present invention.

The system (601) may correspond to the computer (101) described in FIG. 1.

The system (601) includes a component for creating indexes (613). Further, the system (601) may optionally include a component for reading original documents (611) and a component for inserting hinting information (612).

The component for reading original documents (611) may read an original document from the storage (291) and then store the document having hinting information into a storage (292). The component for reading original documents (611) may perform step 202 described in FIG. 2A.

The component for inserting hinting information (612) may associate hinting information with each unique expression in the original document. The component for inserting hinting information (612) may perform step 203 described in FIG. 2A.

The component for creating indexes (613) may read a document having hinting information into a memory from the storage (292) and then create one or more indexes from the document. The component for creating indexes (613) may use a first analysis method or a second analysis method by switching, depending on whether hinting information is associated with a unique expression. The created one or more indexes may be stored into a storage (293) and used for information retrieval. The component for creating indexes (613) may perform steps 205 and 206 described in FIG. 2A, steps 212 to 217 described in FIG. 2B and steps 222 to 232.

The component for creating indexes (613) may include a unit for performing a first analysis method (621) and a unit for performing a second analysis method (622). Further, the component for creating indexes (613) may optionally include a preprocessor (631).

The unit for performing a first analysis method (621) may perform a first analysis method for generating a contiguous sequence of one or more items from a text to create one or more indexes for each sequence of one or more items obtained from the unique expression with which the hinting information is associated.

The unit for performing a second analysis method (622) may perform a second analysis method for dividing the text into meaningful units, such as minimum units that have meaning, to create one or more indexes for each word that has meaning other than the unique expression in the document.

The preprocessor (631) may perform switching from the first analysis method to second the analysis method and from the second analysis method to first the analysis method.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for creating one or more indexes for information retrieval, the method comprising:
   parsing, in computer memory, a document that includes text to identify a unique expression in the text of the document using hinting information that is embedded in the document to identify the unique expression in the document;
   creating a plurality of indexes for the document by applying at least two different analysis methods to the text of the document, wherein creating the plurality of indexes comprises:
   switching between a first analysis method and a second analysis method based on identification of the hinting information in the document, wherein, in response to identifying an instance of the hinting information, the first analysis method is performed to create an index in a first set of indexes for the document that index the unique expression in the text of the document, and switching to the second analysis method to create one or more indexes in a second set of indexes for the document that index one or more sequences of words in the text of the document that are between the instance of the hinting information and one of a next instance of the hinting information and an end of the text,
   wherein the one or more sequences of words do not include the unique expression, wherein the second analysis method is not performed on the unique expression, and wherein the second analysis method is different than the first analysis method; and
   storing the created plurality of indexes in the memory for use in information retrieval.

2. The method of claim 1, wherein creating the plurality of indexes comprises:
   creating one or more indexes of the second set of indexes using the second analysis method until the hinting information is found in the document.

3. The method of claim 1, wherein the hinting information is inserted before and after or only before each unique expression in the document.

4. The method of claim 1, wherein the unique expression is identified according to at least one of using an engine for inferring existence of a unique expression, in response to a unique expression being stored in a storage, using a software application, or manually.

5. The method of claim 1, wherein the unique expression is selected from a group consisting of a proper noun, an abbreviation, a coined word, a new word, and a word or phrase which is described in a language different from a base language used in the document.

6. The method of claim 1, wherein the hinting information is selected from a group consisting of a flag, a tag, and a symbol.

7. The method of claim 6, wherein the flag is at least one of a set of a start tag and an end tag, or a tag having information on the number of words or letters or on the number of bytes in a unique expression for which the first analysis method is used.

8. The method of claim 1, wherein the hinting information includes information on an attribute of the unique expression, and the first set of indexes for each sequence in the unique expression with which the hinting information is associated is created by executing the first analysis method using the attribute information.

9. The method of claim 1, wherein the creation of the first and second sets of indexes from the document are repeatedly carried out, and wherein the repetition is carried out according to at least one of a fixed interval, a set time, manually, in response to the document being updated, or in response to generation of a new document having hinting information.

10. The method of claim 1, wherein the first analysis method is an n-gram analysis and the second analysis method is a morphological analysis.

11. The method of claim 1, wherein the first analysis method is a method for generating a contiguous sequence of items from the unique expression, and wherein the second analysis method is a method for dividing the text other than the unique expression into a plurality of meaningful units.

12. The method of claim 1, wherein the document having embedded hinting information corresponds to an original document, the method further comprising:
retrieving the original document from a storage;
identifying the unique expression in the original document;
embedding the hinting information into the original document, wherein the hinting information includes one or more flags that indicate a location of the unique expression in the original document; and
storing the original document with the embedded one or more flags as the document having embedded hinting information in the storage.

13. The method of claim 1, wherein the document includes text in a first language and text in a second language, wherein the first language is a base language of the document, and wherein the unique expression is the text in the second language.

14. A computer-implemented method for creating one or more indexes for information retrieval, the method comprising:
identifying, by a processor, hinting information embedded in a document that includes text, wherein the hinting information identifies a unique expression in the document;
identifying, by the processor and using the hinting information, the unique expression in the text of the document;
creating, by the processor in response to identifying an instance of the hinting information, an index in a first set of indexes for the document by performing an n-gram analysis to index the unique expression;
switching to a morphological analysis to create, by the processor, one or more indexes in a second set of indexes for the document that index one or more sequences of words in the text of the document that are between the instance of the hinting information and one of a next instance of the hinting information and an end of the text, wherein the one or more sequences of words do not include the unique expression; and
storing, by the processor, the first and second sets of indexes for use in information retrieval.

15. The method of claim 14, wherein the hinting information is a tag embedded in the document, wherein the tag is located directly before the unique expression, and wherein the tag includes a first parameter and a second parameter, the first parameter indicating the number of words in the unique expression, and the second parameter indicating the number of words in each index of the first set of indexes.

16. A computer-implemented method for creating one or more indexes for information retrieval, the method comprising:
analyzing, by a processor, a document having a first language as its base language to identify one or more tags embedded in the document, each tag identifying a unique expression found in text of the document, each unique expression being a word or phrase that is in a second language that is different than the first language;
determining, by the processor and based on the one or more tags, that an n-gram analysis is to be performed to create indexes for each unique expression in the text;
creating, by the processor in response to identifying an instance of the one or more tags in the text of the document, an index in a first set of indexes for the document by performing the n-gram analysis to index the unique expression in the text of the document;
switching to a morphological analysis to create, by the processor, one or more indexes in a second set of indexes for the document that index one or more sequences of words in the text of the document that are between the instance of the one or more tags and one of a next instance of the one or more tags and an end of the text, wherein the one or more sequences of words do not include the unique expression; and
storing, by the processor, the first and second sets of indexes in a computer memory.

17. The method of claim 16, wherein a size of the n-gram analysis for a particular unique expression is based on a value found in the tag associated with the particular unique expression.

18. The method of claim 16, further comprising creating one or more indexes of the second set of indexes using the morphological analysis method until the hinting information is found in the document.

* * * * *